United States Patent
Lazarro

(10) Patent No.: US 7,395,985 B2
(45) Date of Patent: Jul. 8, 2008

(54) ADJUSTABLE RELEASABLE ROPE AND CHORD HOLDER

(76) Inventor: Brian D. Lazarro, 382 th St., Troy, NY (US) 12180

( * ) Notice: Subject to any disclaimer, the term of this patent is extended or adjusted under 35 U.S.C. 154(b) by 333 days.

(21) Appl. No.: 11/187,253

(22) Filed: Jul. 25, 2005

(65) Prior Publication Data
US 2007/0017069 A1 Jan. 25, 2007

(51) Int. Cl.
B65H 75/40 (2006.01)
(52) U.S. Cl. .................. 242/401; 242/405.1; 242/405.2
(58) Field of Classification Search ........................ None
See application file for complete search history.

(56) References Cited

U.S. PATENT DOCUMENTS

| | | | |
|---|---|---|---|
| 851,770 A * | 1/1907 | Nichols | 242/395 |
| 1,559,449 A * | 10/1925 | Mordt | 242/395 |
| 2,470,658 A * | 5/1949 | Simpson | 242/404.3 |
| 3,661,341 A | 5/1972 | Eifrid | |
| 4,123,012 A * | 10/1978 | Hough | 242/405.2 |
| 4,970,884 A * | 11/1990 | Solow | 70/209 |
| 5,014,529 A * | 5/1991 | Wu | 70/209 |
| 5,348,240 A * | 9/1994 | Carmo et al. | 242/401 |
| 5,381,679 A * | 1/1995 | Cummins | 70/209 |
| 6,142,405 A * | 11/2000 | Black | 242/388.6 |
| 6,679,089 B2 * | 1/2004 | Moreton | 70/209 |
| 6,901,781 B1 * | 6/2005 | Lin | 70/209 |

* cited by examiner

Primary Examiner—Jack W. Lavinder
(74) Attorney, Agent, or Firm—Crossley Patent Law; Mark A. Crossley

(57) ABSTRACT

An adjustable length, releasable holder for rope, cord, and other flaccid materials, comprising a longitudinal member into which is inserted an insertion member. The length of insertion is adjustable and immediately releasable. Winding posts with right angles provide for winding the materials about the invention. A handle eases transport or hanging of the invention. Release of the wing screw allows for coiled materials to be instantly released from the invention, thereby saving time and dangerous situations that sometimes arise with ropes and the like.

6 Claims, 2 Drawing Sheets

ADJUSTABLE RELEASABLE ROPE AND CHORD HOLDER

BACKGROUND OF THE INVENTION

Storing and carrying flaccid materials, such as rope, cord, and the like has long been a troublesome task. Typically, what ever flaccid material is wound about a storage device must also be unwound. Difficulties further abound with ropes used in boating, and often dangerous situation occur. Coils of rope holding anchors can be especially dangerous to boaters and passengers alike. Attempting to throw a life preserver, for example, can be difficult, as coils of rope must be perfect in order for the preserver to be properly cast. Cords such as extension and power cords have also long been troublesome in their storage, conveyance, and unwinding. Virtually any flaccid material offers difficulties in storage, conveyance, and use. The present invention offers a unique and basic solution to these problems.

FIELD OF THE INVENTION

The invention relates to devices for holding rope, cord, and the like and more specifically to an adjustable length, releasable rope and cord holder.

SUMMARY OF THE INVENTION

The general purpose of the adjustable releasable rope and cord holder, described subsequently in greater detail, is to provide a adjustable releasable rope and cord holder which has many novel features that result in an improved adjustable releasable rope and cord holder which is not anticipated, rendered obvious, suggested, or even implied by prior art, either alone or in combination thereof.

To accomplish this, the adjustable length, releasable holder for rope, cord, and other flaccid materials comprises a longitudinal member into which is inserted an insertion member. The length of insertion is adjustable and immediately releasable. Winding posts with right angles provide for winding the materials about the invention. A handle eases transport or hanging of the invention. Release of the wing screw allows for coiled materials to be instantly released from the invention, thereby saving time and dangerous situations that sometimes arise with ropes and the like.

The invention provides a portable and hangable device that stores flaccid materials, while also providing an easy means for transporting the same. The invention is offered in a variety of sizes. Typical materials used in the multiple examples of the invention include iron, steel, stainless steel, aluminum, plastics, and composites. In another example, the invention is offered with a handle on the end of the insertion member as well.

Thus has been broadly outlined the more important features of the adjustable releasable rope and cord holder so that the detailed description thereof that follows may be better understood and in order that the present contribution to the art may be better appreciated.

Numerous objects, features and advantages of the adjustable releasable rope and cord holder will be readily apparent to those of ordinary skill in the art upon reading the following detailed description of presently preferred, but nonetheless illustrative, examples of the adjustable releasable rope and cord holder when taken in conjunction with the accompanying drawings. In this respect, before explaining the current examples of the adjustable releasable rope and cord holder in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the adjustable releasable rope and cord holder. It is therefore important that the claims be regarded as including such equivalent constructions insofar as they do not depart from the spirit and scope of the present invention.

Objects of the adjustable releasable rope and cord holder, along with various novel features that characterize the invention are particularly pointed out in the claims forming a part of this disclosure. For better understanding of the adjustable releasable rope and cord holder, its operating advantages and specific objects attained by its uses, refer to the accompanying drawings and description.

DETAILED DESCRIPTION OF THE DRAWINGS

With reference now to the drawings, and in particular FIGS. 1 through 4 thereof, example of the adjustable releasable rope and cord holder employing the principles and concepts of the present invention and generally designated by the reference number 10 will be described.

Figure 1:
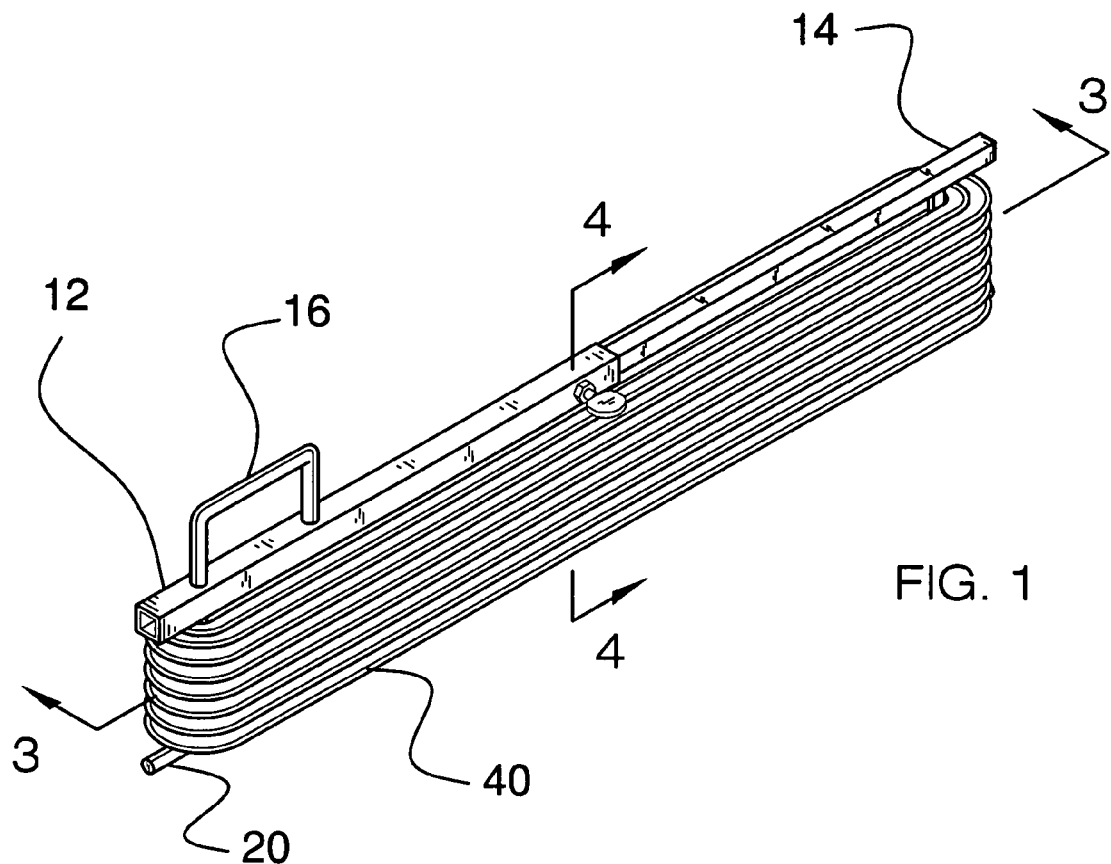
FIG. 1 is a perspective view of the invention holding rope.
Figure 2:
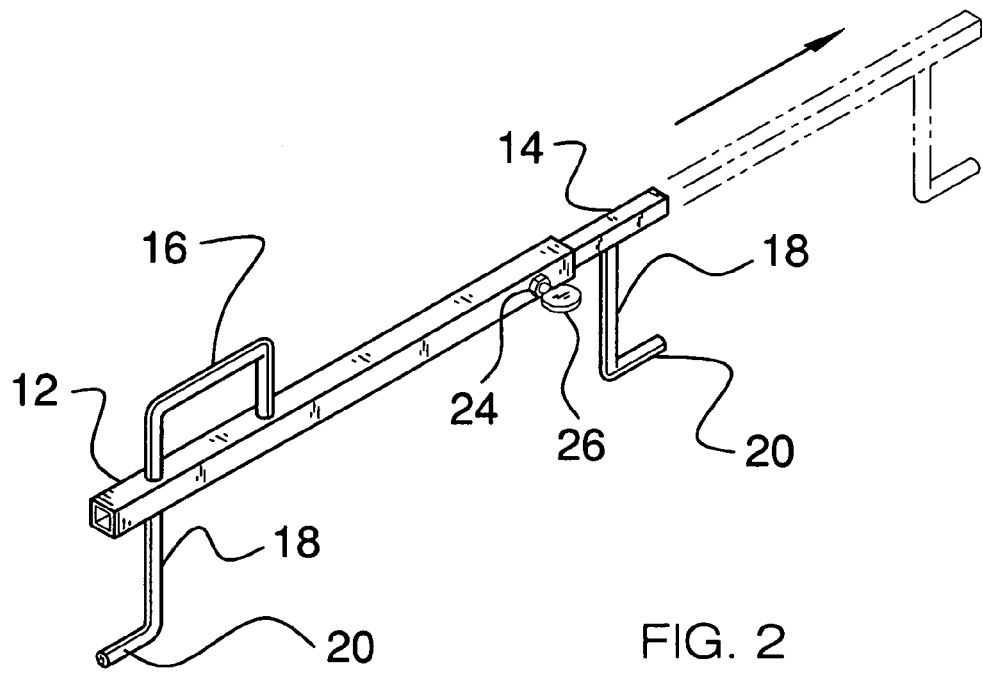
FIG. 2 is a perspective view of the invention illustrating adjustability of the length between the winding posts.

Referring to FIGS. 1 and 2, the invention 10 comprises a hollow parallelepiped longitudinal member 12 having a first end, a second end, and a length therebetween. A winding post 18 is attached proximal to the first end of the longitudinal member 12. The winding post 18 is perpendicular to the length of the longitudinal member 12. The parallelepiped insertion member 14 has a first end, a second end, and a length therebetween. The first end of the insertion member 14 is removably and slideably inserted into the second end of the longitudinal member 12. The winding post 18 is attached proximal to the second end of the insertion member 14. The winding post 18 is perpendicular to the length of the insertion member 14. The winding post 18 is coplanar to the winding post 18 of the longitudinal member 12. The rope 40 is removably wound about the winding posts 18 of the invention 10. The longitudinal member 12 further comprises a handle 16. The handle 16 is affixed to the longitudinal member 12 on a side opposite the winding post 18. The handle 16 is affixed proximal to the first end of the longitudinal member 12. The winding post 18 of the longitudinal member 12 further comprises a right angle 20. The right angle 20 is perpendicularly attached on an end of the winding post 18 opposite the winding post 18 attachment to the longitudinal member 12. The right angle 20 is coplanar to the length of the longitudinal member 12. The winding post 18 extends outwardly. The right angle 20 is disposed on the winding post 18 of the insertion member 14. The right angle 20 is disposed on an end of the winding post 18 opposite the winding post 18 attachment to the insertion member 14. The right angle 20 is coplanar to the length of the insertion member 14. The winding post 18 extends outwardly. In another example of the invention (not shown), the insertion member 14 further comprises a handle 16. The handle 16 is affixed to the second end of the insertion member 14. The handle 16 is opposite the winding post 18 of the insertion member 14.

Figure 3:
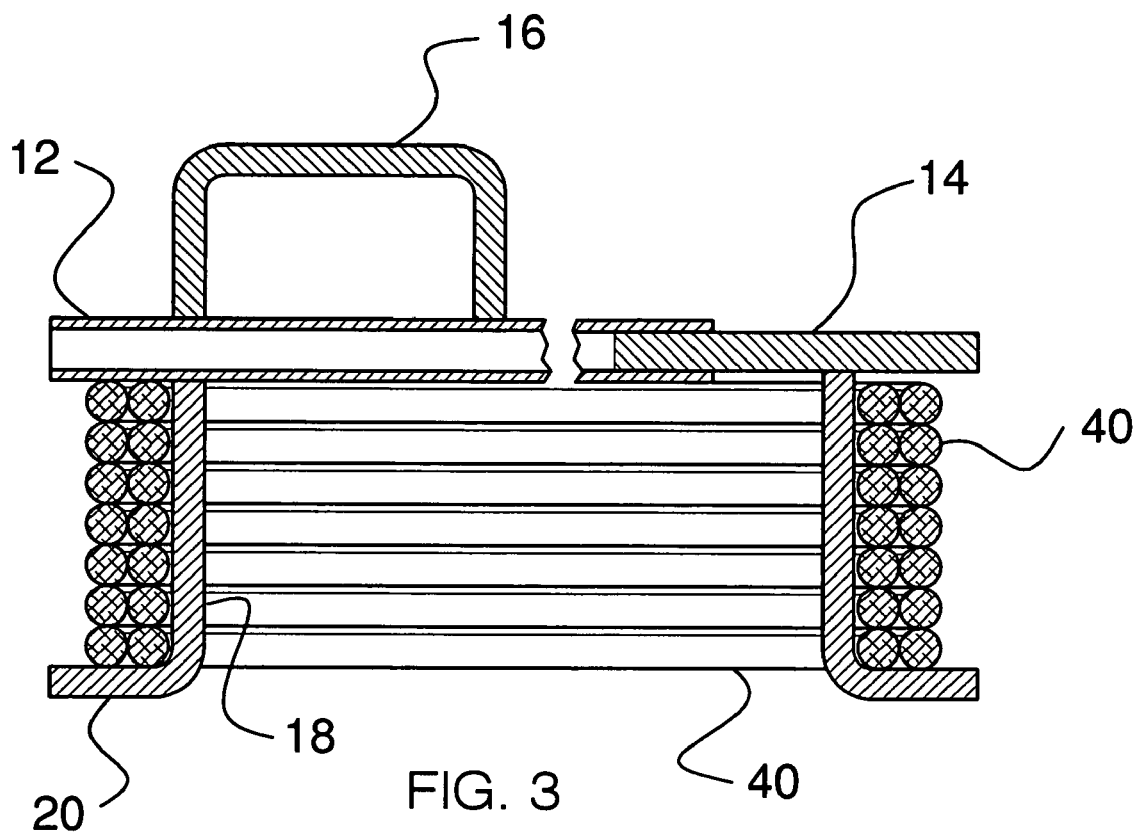
FIG. 3 is cross sectional view of the invention in FIG. 1, taken along the line 3-3.
Figure 4:
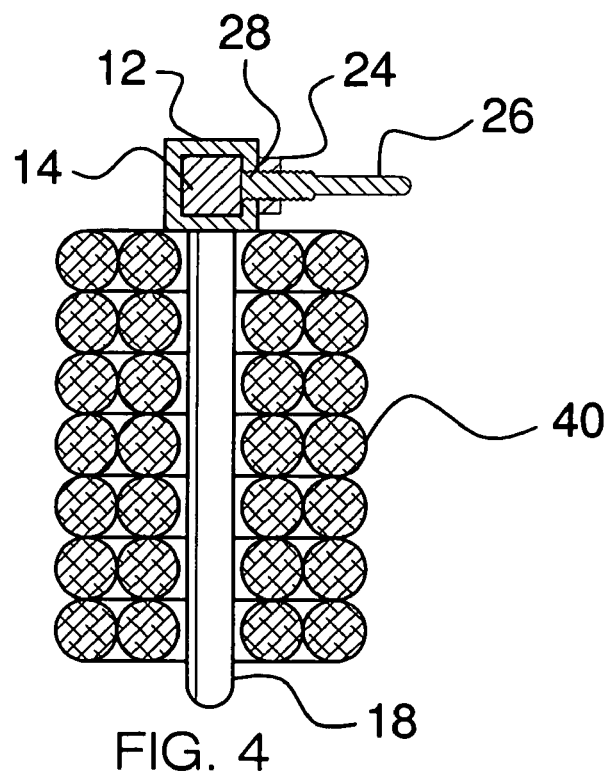
FIG. 4 is a cross sectional view of the invention in FIG. 1, taken along the line 4-4.

Referring to FIGS. 3 and 4, the threaded nut 24 is affixed to the second end of the longitudinal member 12. The thread of the nut 24 is perpendicular to the length of the horizontal member 12. The orifice 28 in the longitudinal member is immediately adjacent to the thread of the nut 24. The wing screw 26 is for removable insertion into the nut 24, whereby the wing screw 26 is tightened against a surface of the insertion member 14, thereby temporarily establishing the length of insertion of the insertion member 14 within the longitudinal member 12, thereby temporarily fixing the length between the winding posts 18.

In use, the insertion member 14 is inserted into the longitudinal member 12 to a desired length between the winding posts 18. The wing screw 26 is tightened to temporarily fix the length if the invention 10. A rope 40, cord, or other flaccid material is wound about the winging posts 18. The right angles 20 retain the materials wound around the invention 10. To remove the wound material, a user can choose a method. One method allows the user to simply unwind the wound material, such as the rope 40. The invention 10, however, is more easily used by unscrewing the wing screw 26. The rope 40 is arranged in coils and ready for immediate dispersion without tangling. There is no need to uncoil the rope 40 from around the winding posts 18.

With respect to the above description then, it is to be realized that the optimum dimensional relationships for the parts of the adjustable releasable rope and cord holder, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An adjustable dimension holder for rope, cord, and the like, the holder comprising:
    a hollow parallelepiped longitudinal member having a first end, a second end, and a length therebetween;
    a winding post attached proximal to the first end of the longitudinal member, the winding post perpendicular to the length of the longitudinal member;
    an parallelepiped insertion member, the insertion member having a first end, a second end, and a length therebetween, the first end of the insertion member removably and slideably inserted into the second end of the longitudinal member;
    a winding post attached proximal to the second end of the insertion member, the winding post perpendicular to the length of the insertion member, the winding post coplanar to the winding post of the longitudinal member;
    a threaded nut affixed to the second end of the longitudinal member, the thread of the nut perpendicular to the length of the horizontal member;
    an orifice in the longitudinal member, the orifice immediately adjacent to the thread of the nut;
    a wing screw for removable insertion into the nut,
    whereby the wing screw is tightened against a surface of the insertion member, thereby temporarily establishing the length of insertion of the insertion member within the longitudinal member,
    thereby temporarily fixing the length between the winding posts,
    whereby the rope, the cord, or the like is removably wound about the winding posts of the holder.

2. The invention of claim 1 wherein the longitudinal member further comprises a handle.

3. The invention in claim 2 wherein the handle is affixed to the longitudinal member on a side opposite the winding post.

4. The invention in claim 3 wherein the handle is affixed proximal to the first end of the longitudinal member.

5. The invention in claim 4 wherein the winding post of the longitudinal member further comprises a right angle, the right angle perpendicularly attached on an end of the winding post opposite the winding post attachment to the longitudinal member, the right angle coplanar to the length of the longitudinal member, the winding post extended outwardly;
    a right angle on the winding post of the insertion member, the right angle on an end of the winding post opposite the winding post attachment to the insertion member, the right angle coplanar to the length of the insertion member, the winding post extended outwardly.

6. The invention in claim 5 wherein the insertion member further comprises a handle, the handle affixed to the second end of the insertion member, the handle opposite the winding post of the insertion member.

* * * * *